(12) United States Patent
Counts et al.

(10) Patent No.: US 7,933,612 B2
(45) Date of Patent: Apr. 26, 2011

(54) DETERMINING PHYSICAL LOCATION BASED UPON RECEIVED SIGNALS

(75) Inventors: Scott J. Counts, Seattle, WA (US); John C. Krumm, Redmond, WA (US); Jordan L. K. Schwartz, Seattle, WA (US); Steve C. Glenner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/427,957

(22) Filed: Jun. 30, 2006

(65) Prior Publication Data

US 2007/0202887 A1 Aug. 30, 2007

Related U.S. Application Data

(60) Provisional application No. 60/777,317, filed on Feb. 28, 2006.

(51) Int. Cl.
*H04W 24/00* (2009.01)
(52) U.S. Cl. .......... 455/457; 455/456.1; 455/456.2; 455/456.5
(58) Field of Classification Search ........... 455/456.1, 455/456.2, 456.5, 457
See application file for complete search history.

(56) References Cited

U.S. PATENT DOCUMENTS

| | | | |
|---|---|---|---|
| 5,163,004 A | 11/1992 | Rentz | |
| 5,404,376 A | 4/1995 | Dent | |
| 5,493,692 A | 2/1996 | Theimer et al. | |
| 5,508,707 A | 4/1996 | LeBlanc et al. | |
| 5,515,062 A | 5/1996 | Maine et al. | |
| 5,570,412 A | 10/1996 | LeBlanc | |
| 5,652,570 A | 7/1997 | Lepkofker | |
| 5,659,596 A | 8/1997 | Dunn | |
| 5,666,662 A | 9/1997 | Shibuya | |
| 5,732,354 A * | 3/1998 | MacDonald | ............... 455/456.2 |
| 5,781,150 A | 7/1998 | Norris | |
| 5,905,789 A | 5/1999 | Will | |
| 5,917,425 A | 6/1999 | Crimmins et al. | |
| 5,919,239 A | 7/1999 | Fraker et al. | |

(Continued)

FOREIGN PATENT DOCUMENTS

JP 1999-252629 A2 9/1999

(Continued)

OTHER PUBLICATIONS

Matthias Kopczynski, et al., "Localisation with sketch based input", in: Georg Gartner (Ed.): Location Based Services & Telecartography, Proceedings of the Symposium 2004, 10 pages.

(Continued)

*Primary Examiner* — Yuwen Pan
(74) *Attorney, Agent, or Firm* — Lee & Hayes, PLLC

(57) ABSTRACT

The subject disclosure pertains to systems and methods for determining locations of mobile devices. In particular, a set of regions is defined based upon the relative strength of signals received from one or more base stations within the region. Each region has associated location information (e.g., latitude and longitude). The location of a mobile device can be determined by analyzing the strength of received signals, identifying base stations and generating an ordered list of base stations based upon signal strength. The ordered list can be compared to the set of regions to determine the region in which the mobile device is located. The location information for the retrieved region can be used to estimate the location of the mobile device.

17 Claims, 12 Drawing Sheets

U.S. PATENT DOCUMENTS

| | | | |
|---|---|---|---|
| 5,977,913 | A | 11/1999 | Christ |
| 6,091,362 | A | 7/2000 | Stilp et al. |
| 6,091,957 | A | 7/2000 | Larkins et al. |
| 6,167,274 | A | 12/2000 | Smith |
| 6,201,803 | B1 | 3/2001 | Munday et al. |
| 6,201,973 | B1 | 3/2001 | Kowaguchi |
| 6,236,365 | B1 | 5/2001 | LeBlanc et al. |
| 6,259,991 | B1 | 7/2001 | Nysen |
| 6,266,533 | B1 | 7/2001 | Zadeh et al. |
| 6,327,535 | B1 | 12/2001 | Evans et al. |
| 6,331,825 | B1 | 12/2001 | Ladner et al. |
| 6,363,323 | B1 | 3/2002 | Jones |
| 6,381,464 | B1 * | 4/2002 | Vannucci ............... 455/456.1 |
| 6,445,927 | B1 * | 9/2002 | King et al. ............. 455/456.6 |
| 6,473,038 | B2 | 10/2002 | Patwari et al. |
| 6,480,713 | B2 | 11/2002 | Jenkins et al. |
| 6,512,478 | B1 | 1/2003 | Chien |
| 6,529,164 | B1 | 3/2003 | Carter |
| 6,542,750 | B2 | 4/2003 | Hendrey et al. |
| 6,594,666 | B1 | 7/2003 | Biswas et al. |
| 6,675,018 | B2 * | 1/2004 | Villier et al. ........... 455/456.1 |
| 6,721,755 | B1 | 4/2004 | Lee |
| 6,745,124 | B2 | 6/2004 | Aloi et al. |
| 6,799,047 | B1 | 9/2004 | Bahl et al. |
| 6,823,188 | B1 | 11/2004 | Stern |
| 6,839,560 | B1 | 1/2005 | Bahl et al. |
| 6,889,052 | B2 * | 5/2005 | Geier et al. ............ 455/456.1 |
| 6,909,903 | B2 | 6/2005 | Wang |
| 6,944,679 | B2 | 9/2005 | Parupudi et al. |
| 6,952,181 | B2 | 10/2005 | Karr et al. |
| 7,020,475 | B2 | 3/2006 | Bahl et al. |
| 7,415,516 | B1 | 8/2008 | Gits et al. |
| 2001/0027114 | A1 | 10/2001 | Kim |
| 2002/0122003 | A1 | 9/2002 | Patwari et al. |
| 2002/0132625 | A1 * | 9/2002 | Ogino et al. ................ 455/456 |
| 2003/0148773 | A1 | 8/2003 | Spriestersbach et al. |
| 2004/0072582 | A1 * | 4/2004 | Aljadeff et al. .......... 455/456.1 |
| 2004/0081120 | A1 | 4/2004 | Chaskar |
| 2004/0203884 | A1 | 10/2004 | McCalmont et al. |
| 2005/0245271 | A1 | 11/2005 | Vesuna |
| 2005/0245275 | A1 * | 11/2005 | Byford et al. ............ 455/456.6 |

FOREIGN PATENT DOCUMENTS

| | | | |
|---|---|---|---|
| JP | 1999-298946 A2 | 10/1999 | |

OTHER PUBLICATIONS

Zhengdao Xu, et al., "Efficient Constraint Processing for Location-aware Computing", International Conference on Mobile Data Management, Proceedings of the 6th international conference on Mobile data management, 2005, pp. 3-12.

Robert P. Minch, "Privacy Issues in Location-Aware Mobile Devices," hicss, Proceedings of the 37th Annual Hawaii International Conference on System Sciences (HICSS'04)—Track 5, 2004, 10 pages.

POLS, accessible at: http://pols.sourceforge.net, last accessed Aug. 9, 2006, 1 page.

V. Otsason, et al., "Accurate GSM Indoor Localization", Ubicomp, Lecture Notes in Computer Science., Springer, 2005 pp. 141-158, vol. 3660.

International Search Report dated Jul. 31, 2007 for PCT Application Serial No. PCT/US2007/004138, 3 Pages.

* cited by examiner

DETERMINING PHYSICAL LOCATION BASED UPON RECEIVED SIGNALS

CROSS-REFERENCE TO RELATED APPLICATIONS

This is an application claiming benefit under 35 U.S.C. 119(e) of U.S. Provisional Patent application Ser. No. 60/777,317 entitled "DETERMINING PHYSICAL LOCATION BASED UPON RECEIVED SIGNALS" and filed Feb. 28, 2006. The entirety of the above-noted application is incorporated by reference herein.

BACKGROUND

Mobile or portable devices have become increasingly popular and prevalent in today's society. Increased coverage areas, additional functionality and reductions in weight and size have enhanced the appeal of portable devices. Many users utilize a mobile device such as a cell phone or smartphone as their primary means of communication and carry such devices with them constantly.

One advantage of these mobile devices is their usefulness in emergency situations. For example, motorists can utilize a portable device to call or contact help when their car breaks down. Accurate location of mobile devices during emergencies can be critical. However, frequently users are not able to accurately direct emergency services to their location in such situations. Users can be flustered and signs or other location designators may not be visible during an emergency. Automatic detection of location by the mobile device can help ensure that emergency services are able to locate and assist a user in a crisis.

Automatic location detection can enhance the usability of mobile devices in non-emergency situations as well. Mobile devices can include a variety functions such as cellular phone service, voice over Internet protocol ("VoIP") phone service, software applications, email access, Internet capabilities, calendar functions, music players and the like. It is likely that functions will continue to be added to mobile devices further increasing device usefulness. Many of these functions can be enhanced based upon the location of the user.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns determining location of a mobile device based upon the relative strength of received signals. In one aspect, a set of physical regions, referred to as rank regions, can be defined based upon the relative signal strengths of detectable base stations within the region. Each rank region can have an associated ordered list of base stations that describes the relative strength of the signals received from the base stations. Each rank region can be represented as a bounding box, a polygon, or as a single point of location information (e.g., latitude and longitude coordinates). A set or list of rank regions can be maintained for a geographical area.

In one aspect, the current position of a mobile device can be determined based upon an ordered list of the relative strength of received signals from identified base stations and a set of rank regions. The current ordered list of base stations for the mobile device can be compared to the ordered lists of the rank regions. Once a matching rank region is found, the location information for the rank region can be obtained and used as an estimated location of the mobile device.

In another aspect, confidence indicators can be generated for the location information. A confidence indicator for a rank region can be generated based upon the number of identified base stations within the current ordered list of the mobile device that can be matched to the ordered list of the rank region. Typically, the more bases stations matched to the ordered list of the rank region, the more likely it is that the mobile device is within the rank region and the higher the confidence level. An additional confidence indicator can be generated based upon the size of the geographical area represented by the rank region. Large rank regions can result in reduced accuracy.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
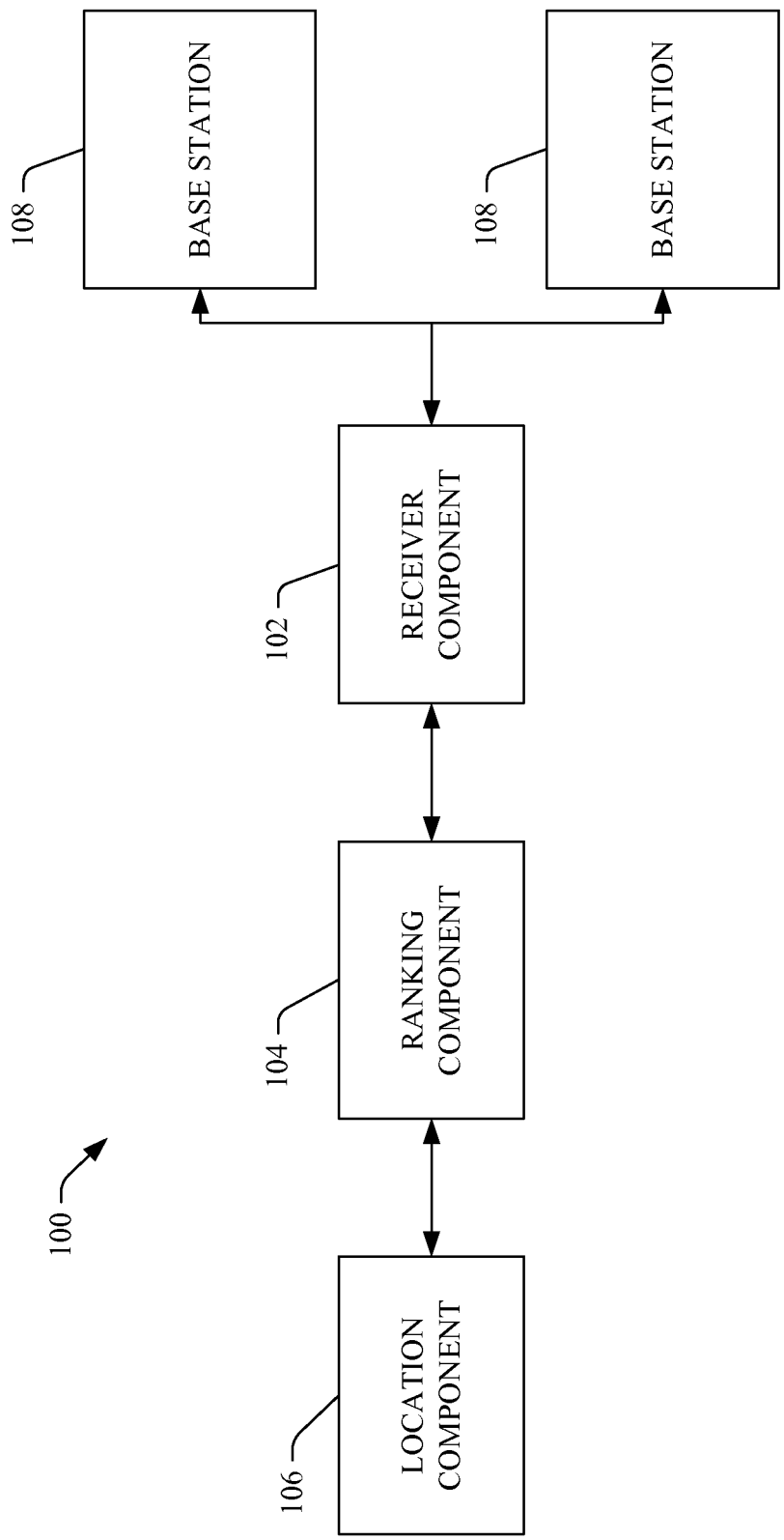
FIG. 1 is a block diagram of a system for determining location of a mobile device in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In addition to location detection for emergency services, there are numerous advantages to automatically and efficiently determining the location of a mobile device. For example, a software application resident on a mobile device can report the location of the device to the owner's friends or family. This can be particularly useful where the owner or user of the device is a child. In addition, media content, such as photographs captured using the mobile device can be automatically tagged with the geographical coordinates at which the images were created. Mobile device users can also receive proximity or location-based reminders. For example, if the user is near a dry-cleaner, the mobile device can generate a reminder to pick up dry-cleaning. In addition, if the user's friends or family members also have mobile devices with automatic location detection, the mobile device can notify the user if friends or family members are nearby.

Mobile devices can also obtain useful or relevant information based upon geographical location. For instance, a mobile device can retrieve weather forecasts, maps or local news based upon current location. Location detection can also be used as a marketing tool, delivering product information to users. Vendors can transmit advertisements or coupons to users based upon proximity of the mobile device to a vendor store.

Mobile devices can utilize location information to generate alerts or notifications for users. For example, a weather application can utilize location information to monitor local weather and generate an alert notifying the user of proximity of severe weather (e.g., severe thunderstorms, hail, ice storms, tornados and the like). In another example, location information can be used to monitor traffic and notify a user of traffic delays and/or provide alternate routes. The applications discussed above are simply a small set of exemplary uses. Location information can be used in a myriad of ways.

Location of mobile devices can be determined using Global Positioning Systems or GPS. GPS was originally a military satellite location system designed to aid the military in troop movements and equipment locations. The government has since provided tracking from their satellites to the public. The first civilian devices that utilized satellite tracking were bulky and hard to use. Since then, GPS units have shrunk tremendously in size and can be easily transported. However, by the nature of its technology, GPS works best when it can directly access a minimum number of satellites, limiting its use in congested areas such as in larger cities with skyscrapers and indoors.

In the absence of GPS, determining the physical location of a mobile device can be a complex and costly problem. Various triangulation systems determine the physical locations of a set of base stations based upon the strength of the signal received from the base stations as measured at multiple locations. A mobile device's location can then be determined using triangulation based upon the measurement of base station signal strengths by the mobile device. However, errors in distance determination can be introduced if the signal is reflected off of various surfaces. In addition, algorithms for triangulation can be complex and sophisticated. Furthermore, processing initial base station signal strength measurements can be computationally intensive, requiring relatively long periods of time. Differences in the method or quality of reception of signals by the mobile devices can also lead to inaccuracies in the determination of mobile device location when using triangulation algorithms.

Determining physical location of a mobile device using triangulation algorithms can be further complicated based upon the directionality of signals of base stations. Typically, base station signals can be aimed or directed in a particular line or course. The signal direction of a base station impacts the measured strength of signal and therefore the calculation of distance based upon signal strength, further complicating triangulation calculations. To facilitate mobile device location detection, it may be necessary to determine base station directionality prior to calculating mobile device position.

Referring now to FIG. 1, a location detection system 100 for determining the location of a mobile device is illustrated. Mobile devices can include laptops, personal digital assistants (PDAs), cell phones, smartphones, devices with Wi-Fi and the like. The location detection system 100 can include a receiver component 102 located on the mobile device. The receiver component 102 can receive signals from one or more base stations 108. Signals can be received from any number of base stations 108. The receiver component 102 can determine identifiers for the detected base stations 108 based upon the transmitted signal. As used herein, a base station 108 can include any fixed transmitter such as cell towers, access points, commercial transmitters and the like. Because base stations 108 are generally fixed in position, the location of a mobile device can be determined based upon received signals from one or more base stations 108. In particular, a ranking or ordering of the base stations 108 based upon signal strength as received by the receiver component 102 can be used to determine the location of the mobile device without requiring complex computations, such as those necessary for triangulation.

The ranking component 104 can utilize the received signal strengths and base station identifiers to determine an ordered list of the base stations 108 detected by the receiver component 102. To facilitate processing, the list of base stations 108 can include base station identifiers ordered from the strongest received signal to the weakest received signal. Alternatively, base stations 108 can be arranged within the list from weakest to strongest signal or any other logical order based upon received signal strength. The location component 106 can utilize the ordered list of base stations to obtain location information for the mobile device. The location component 106 can compare the ordered list of base stations of a mobile device to ordered lists of base stations for a set of rank regions to determine a rank region associated with current location of the receiver component 102 and therefore, the mobile device. A rank region, as used herein, is a physical region or area associated with a particular ranking or ordering of detected base stations. A rank region can be defined by the relative signal strength of some or all of the detectable base station signals within the region. In particular, each rank region can be defined by an ordered list of one or more base stations 108. The location component 106 can return location or position information based upon the rank region. In addition, confidence indicators for precision of the computed location can be generated and returned along with location information.

Because the location detection system 100 utilizes relative signal strength of base stations 108 to determine location rather than actual signal strength values, the location detection system 100 can be independent of differences in reception among mobile devices. For example, if the received single strengths as measured by a first mobile device are consistently greater than signal strengths as measured using a second mobile device, the difference in reception between the first and second mobile devices will not impact the ranked order of signal strengths produced by each device. The first and second mobile device need not measure the same signal strength for a given location, they need only be consistent in their ordering of detected base stations 108.

In addition, the location detection system 100 can automatically account for unknown directionality of base stations 108. Directionality of a base station can be difficult to determine in practice. Because the location detection system 100 is concerned only with the relative signal strengths at a particular point, rather than the calculation of distance based upon signal strength, the location detection system 100 does not need to determine the directionality of base stations.

Figure 2:
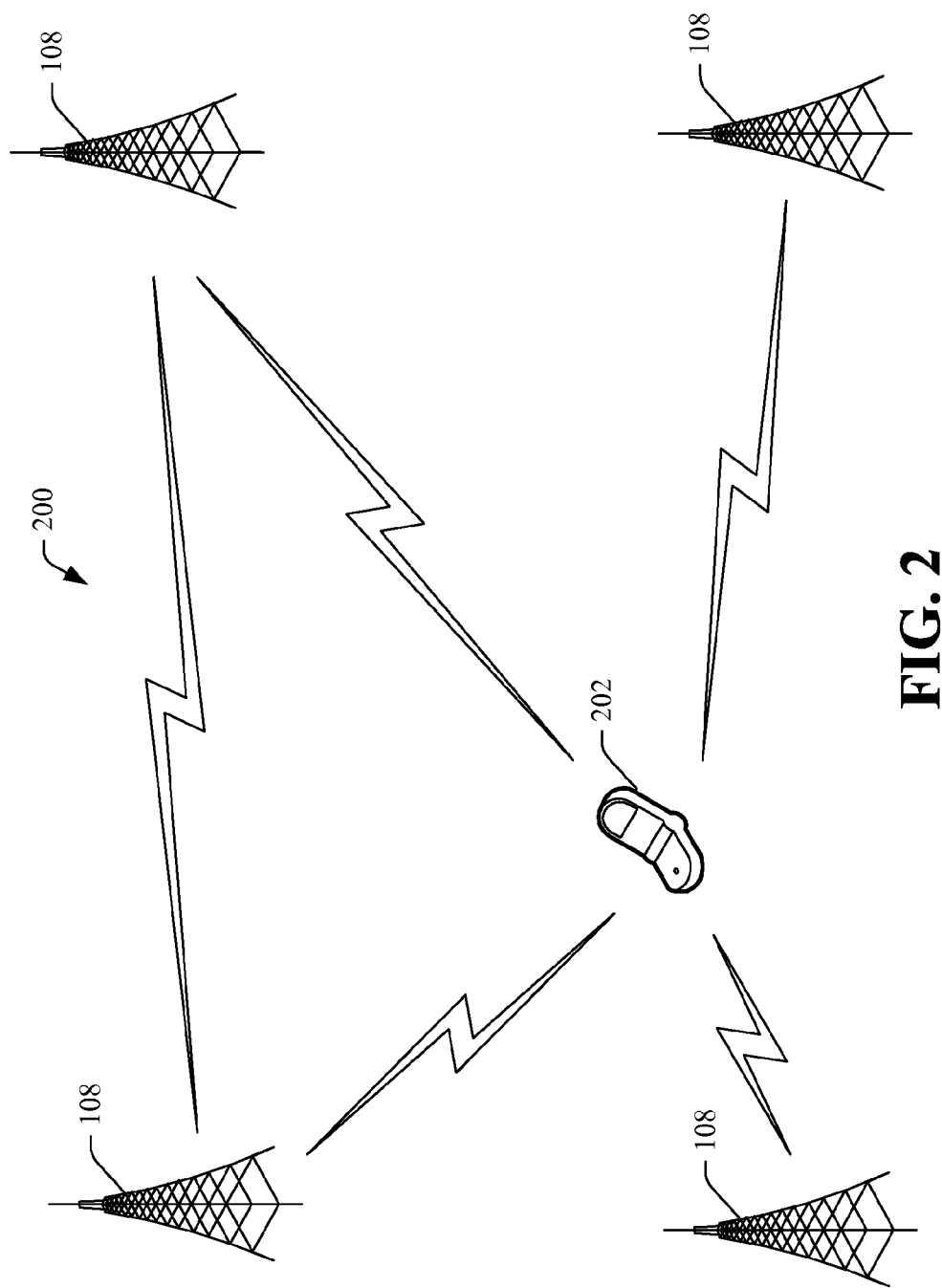
FIG. 2 is an exemplary wireless environment in accordance with an aspect of the subject matter disclosed herein.

Referring now to FIG. 2, a wireless environment 200 for mobile devices is illustrated. The environment 200 can comprise one or more base stations 108 in one or more sectors that receive, transmit, repeat, etc., wireless communication signals to each other and/or to one or more mobile devices 202. Each base station 108 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). The sectors or regions in which base stations 108 transmit signals frequently overlap to ensure mobile devices 202 can continuously receive signals. Mobile devices 202 can be, for example, cellular phones, smart phones, laptops, handheld communication devices, handheld computing devices, satellite radios, PDAs, and/or any other suitable device for communicating over wireless system 200. Each mobile device 202 can receive signals from multiple base stations 108. Wireless communication signals can include Wi-fi, radio and/or television broadcasts, ultrasound signals or any other measurable signals.

Figure 3:
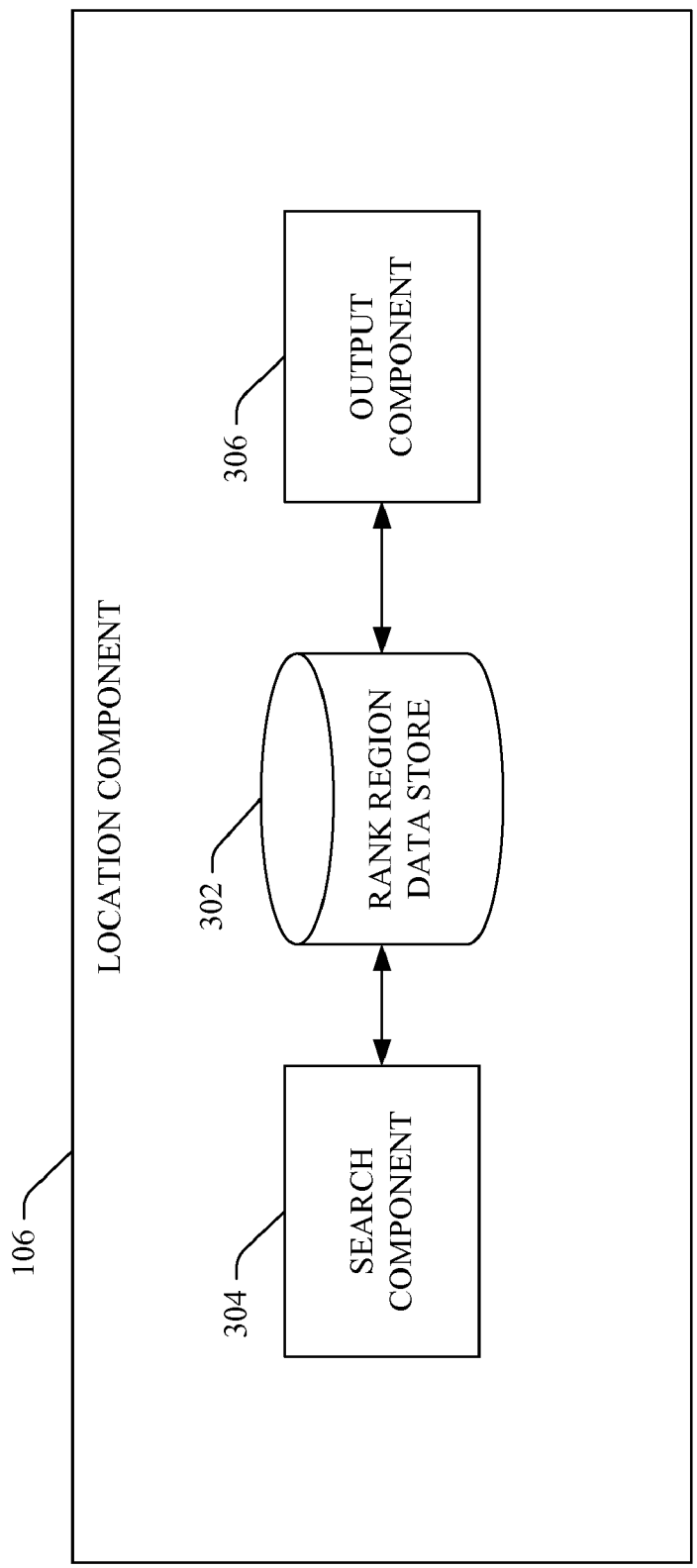
FIG. 3 is a block diagram of a system for determining location of a mobile device based upon a ranking of received signals in accordance with an aspect of the subject matter disclosed herein.

Referring now to FIG. 3, a detailed view of an exemplary location component 106 is illustrated. The location component 106 can be remotely located or located on the mobile device. The location component 106 can include a rank region data store 302 that includes a set of rank regions for a geographical area. A data store, as used herein, is any collection of data including, but not limited too, a database or collection of files. The rank region data store 302 can be updated periodically to reflect changes in rank regions due to changes in the number, availability or configuration of base stations and the like. The location component 106 can also include a search component 304 that generates a search of the rank region data store 302 based upon the ordered list of base stations generated from a mobile device at a given location. The search component 304 can search the rank region data store 302 for a rank region or regions that match the ordered or ranked list of base stations for the current position of the mobile device. The location component 106 can also include an output component 306 that returns location information based upon the results of the search of the rank region data store 302. Location information can include a street address, latitude and longitude, or any other geographic location designator. The output component 306 can return location information for the matching rank region as well as a confidence indicators associated with the matching rank region.

Figure 4:
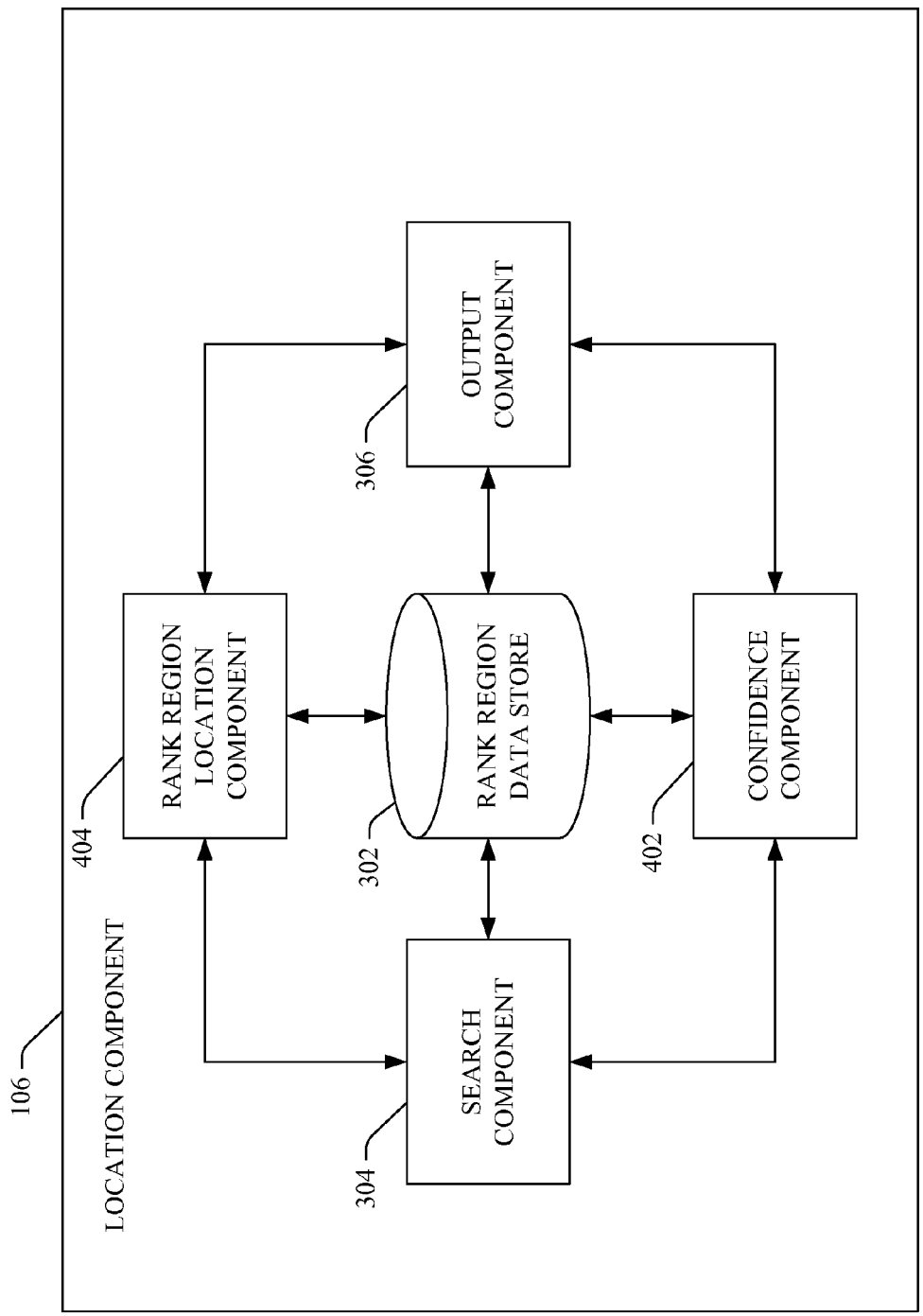
FIG. 4 is a block diagram of a system for determining location of a mobile device and generating confidence indicators in accordance with an aspect of the subject matter disclosed herein.

Referring now to FIG. 4, a detailed view of an exemplary location component 106 providing confidence indicators is illustrated. The location component 106 can include a confidence component 402 that can generate confidence indicators, including a confidence radius and/or confidence level based upon the matching region and the number of matched base stations, respectively. The confidence radius can be based upon the approximate size of the rank region that matches the current ordered list of base stations for the mobile device. The size of the rank region can be indicative of the accuracy of the location information for the rank region. The rank region containing the mobile device can be identified, but the position of the mobile device within the rank region is not necessarily determined. Consequently, the larger the physical region covered by the rank region, the greater the uncertainty regarding the precise location of the mobile device.

The location component 106 can include a rank region location component 404 that determines or estimates the location of mobile devices within a rank region based upon the relative strength of received signals. The received signal strengths can be compared to signals received at data points used to generate rank regions. The data point with recorded signal strengths closest to those recorded at the current mobile device location, either in relative or absolute strength, can be selected. Location data for the selected data point can be used to estimate the location of the mobile device within the rank region. For example, both a first data point and a second data point can generate the same rank order of base station signal strengths (A, B, C). Here, the ordered lists are denoted by parentheses. However, for the first data point, the strength of signal received from base station B can be significantly closer to the strength of the signal received from base station A, while at the second data point the strength of the signal received from base station B can be significantly closer to that received from base station C. Accordingly, if received signal strength from base station B at the mobile device is closer in strength to the signal from base station A than that received from base station C, the location information for the first data point can be used to estimate the location of the mobile device.

The confidence level can also be based upon the number of base stations used to match the mobile device to a rank region. The more base stations used to generate the ordered list and matched to determine the rank region, the higher the confidence level. Consequently, if the ordered list contains matches for only a few of the base stations in the ordered list for the rank region, the confidence level will be low. One way to report a confidence level is simply to report the number of base stations matched. The confidence levels associated with various numbers of matched base stations can also be determined based upon test data. A set of test data points can be collected, where the actual location for each test data point is known. The location information can be determined based upon rank region for each test data point and compared to the actual location of the test data points. The results for the test data points can be grouped based upon the number of base stations used to determine rank region for the data point. These grouped results can be averaged and used to determine a confidence level associated with a number of base stations used to identify a rank region. The confidence level can reflect error in distance associated with reporting the mobile device's location at the rank region.

Additional confidence indicators can be generated based upon the rank of matched base stations in the ordered list of the mobile device. Rank regions matching identified base stations higher in the rank in the ordered list of the mobile device can result in greater accuracy, and accordingly would have a higher confidence level. In addition, rank regions matched using only weak received signal strengths can be less reliable than those with strong received signal strengths.

Confidence indicators, such as confidence level and radius, can be used to determine how or whether a mobile device application will utilize location information. Users, software applications and the like can elect to ignore current location information or modify their actions if confidence levels are below one or more predetermined thresholds. Users or application can continue to use previously determined location information rather than utilizing more recent location information with a low confidence level. In addition, confidence levels for previous location information can be reduced over time. As location information ages, it is regarded as less reliable and more recent location information is more likely to be used. Use of confidence indicators helps ensure the accuracy of location information for the mobile device.

Figure 5:
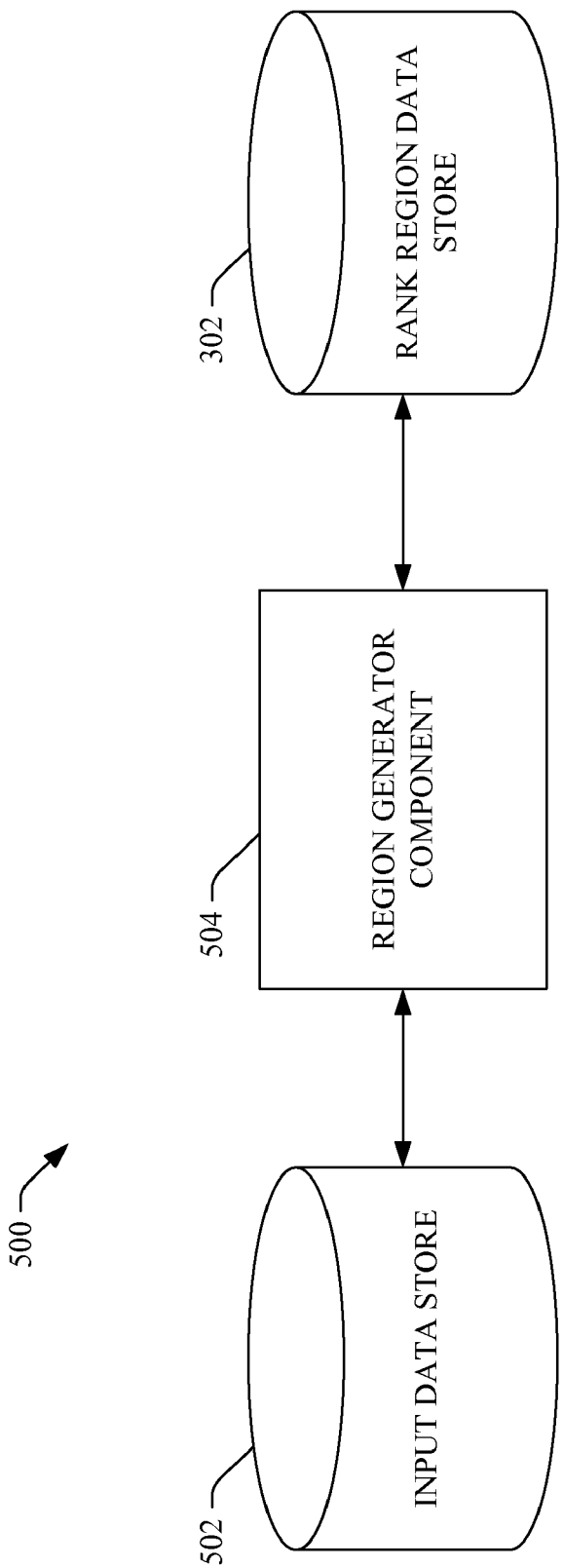
FIG. 5 is a block diagram of a system for generating rank regions in accordance with an aspect of the subject matter disclosed herein.

Referring now to FIG. 5, a system 500 for generating rank region data is illustrated. The system 500 can include one or more input data stores 502. Input data from the input data store 502 can include lists of detected base stations, strengths of signals received from the detected base stations as well as the locations at which the signals were sampled and received signal strength was measured. An input data point, as used herein, is a sample of the signal strengths for each detected based station at a particular location. The input data store 502 can include a collection of input data points for a geographic area. Input data points can be collected using a receiver that searches for signals while mounted on a vehicle traversing the geographical area. For example, input data points for Wi-Fi wireless networks can be obtained by searching for networks using a moving vehicle equipped with a receiver (e.g., a PDA or laptop with a Wi-Fi access system), referred to as war-driving. GPS coordinates can be used to determine the location of the vehicle at the time the received signal strengths are measured.

The system 500 can include a region generator component 504 that utilizes the information from the input data store 502 to define rank regions based upon the signal strength of some or all detectable base stations in the region. In particular, each rank region can be defined by an ordered list of some number of base stations. For example, in a first region signals can be received from base stations A, B and C. The base stations can be ordered (A, B, C) in terms of received signal strength from highest to lowest. In another example, a second region can include signals from base stations B and D. In this region the base stations can be ordered as (D, B), where the received strength of base station D is greater than the received signal strength of base station B. In yet another example, a region includes a received signal from only one base station, C. These regions can be derived from the input data points from the input data store 502 by the region generator component 504 and stored in the rank region data store 302.

Figure 6:
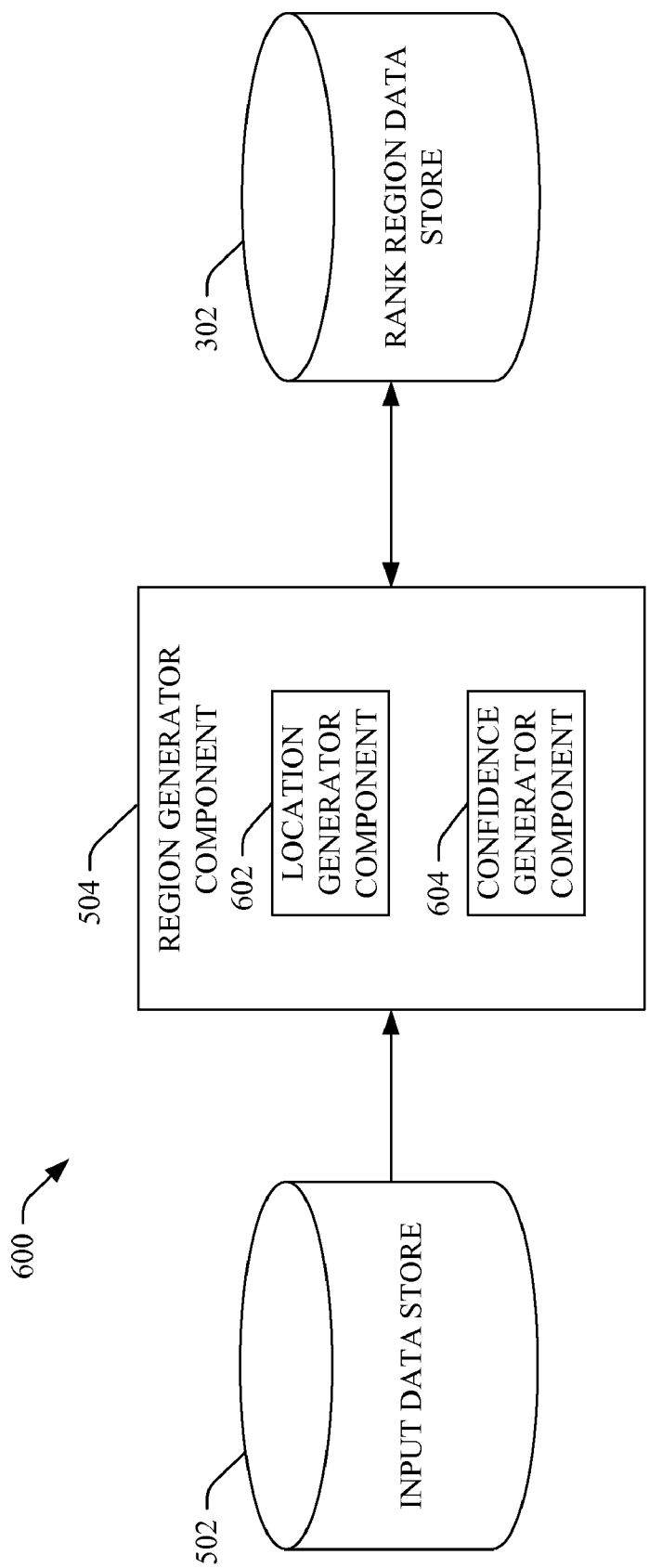
FIG. 6 is a block diagram of a system for generating rank regions and confidence indicators in accordance with an aspect of the subject matter disclosed herein.

Referring now to FIG. 6, a system 600 for generating rank region data including confidence indicators is illustrated. The region generator component 504 can include a location generator component 602 and a confidence generator component 604. The location generator component 602 can generate geographic location information associated with a rank region. The confidence generator component 604 can generate confidence indicators (e.g., confidence radius) associated with rank regions. In addition, the confidence generator component 604 can generate confidence levels based upon the number base stations matched during determination of rank region.

The regions identified by the ranking data can be represented as a single region point or location (e.g., latitude and longitude). The location generator component 602 can calculate or generate a region point in multiple ways. In particular, region points can be calculated by averaging the locations (e.g., latitude and longitude) of all of the input data points that qualify to be included in the region. Input data points qualify for inclusion in regions based upon the ordered list of base stations generated for the input data point using the relative strength of signals received at the input data point. Alternatively, region points can be generated by finding the median location of the input data points included in the region.

The region point associated with each region can be maintained in the rank region data store 302. Once a current region for a mobile device is identified based upon the ordered list of base stations associated with the device, the region point for the identified region can be returned as the estimated location of the mobile device. Alternatively, a representation of the entire rank region can be returned, such as a bounding box or polygon.

The confidence generator component 604 can generate one or more confidence indicators, such as a confidence radius and a confidence level. Each rank region can have an associated confidence radius based upon the size or coverage area of the rank region. Confidence levels are not necessarily based upon particular rank regions. Instead, confidence level can be based upon the number of identified base stations received at the mobile device and used to match the mobile device to a rank region. For example, a mobile device can receive signals from three base stations (A, B and C). If the rank region is identified based upon the order of all three of the base stations a confidence level for three stations can be generated. If the match is made using only two of the base stations (A and B), a different, lower confidence level based upon matching of two base stations is generated.

Confidence levels for possible numbers of matched base stations can be calculated, generating a set of confidence levels. For example, if a mobile device can receive a signal from up to seven base stations, a separate confidence level can be generated for each of the seven possibilities (e.g., matching based on one base station, matching based on two base stations, . . . , and match based on seven base stations). There can be a linear relationship between the number of base stations matched between the mobile device and the rank region and the likelihood the mobile device is located within the rank region. Confidence levels can be calculated using experimental data where the location (e.g., latitude and longitude) of the mobile device is known. The rank region can be determined and compared to the actual location of the mobile device. Errors in location determination can be grouped and averaged based upon the number of base stations used to match the mobile device to a rank region. The averaged error can be used as expected error for future location determinations. Confidence level can be based upon the averaged error for a set number of matched base stations. A set of confidence levels can be maintained in the rank region data store 302.

Figure 7:
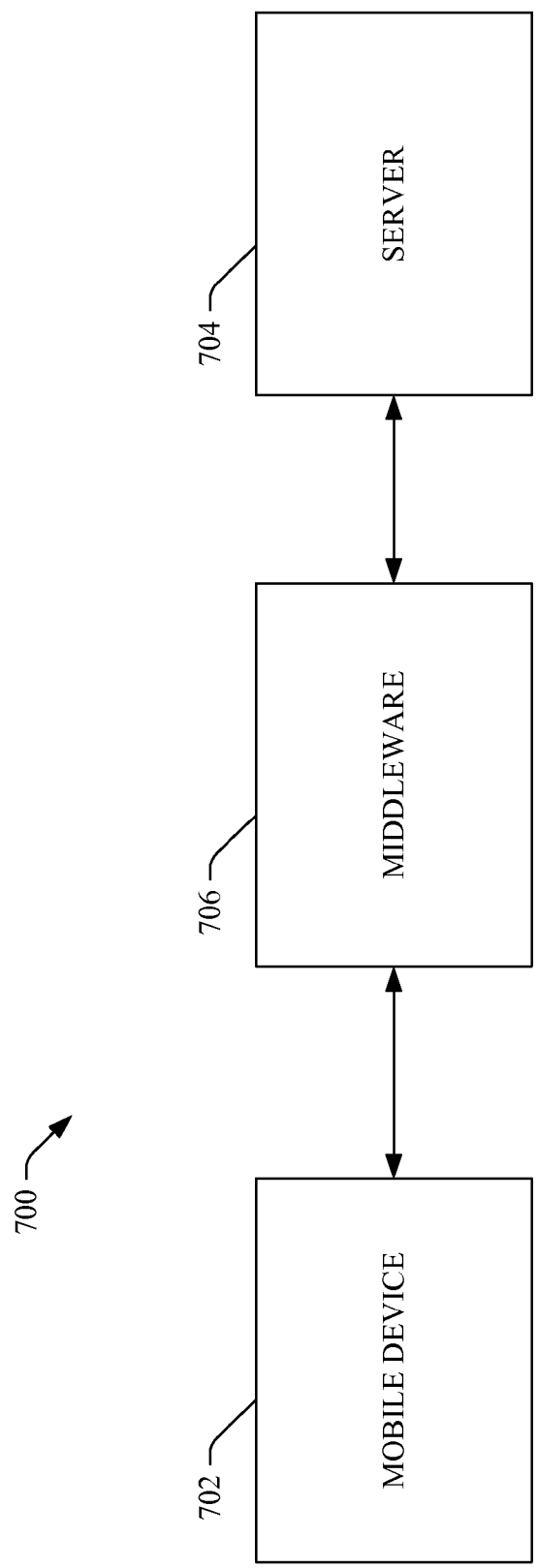
FIG. 7 is a block diagram of a system for determining mobile device location in accordance with an aspect of the subject matter disclosed herein.

Referring now to FIG. 7, a system 700 for determining a mobile device location is illustrated. The system 700 includes a mobile device 702 that determines base station identifiers and signal strength for signals received from detected base stations. The base station identifiers and signal strength data can be transmitted to a server 704 through middleware 706 (e.g., ASP.NET middle layer API) or any other transport mechanism. The middleware can generate a location query for the server based upon the ordered list of base stations. The middleware can receive location results such as rank region data from the server and output results to the mobile device 702. The server 704 can include a rank region data store, which can be implemented using a structured query language (SQL) database or any other suitable mechanism for storing data. Computation of the location of the mobile device 702 can occur at the middleware 706 (e.g., web service) or at the server 704 including the data store. Alternatively, rank region data can reside on the mobile device 702, enabling location computation to be self-contained within the mobile device 702 and eliminating the need for a network connection.

In another aspect, the rank region data store can be contained within the mobile device. Accordingly, the mobile device can determine rank region without transmitting a signal to a server. Alternatively, rank region information can be stored as a set of files shared over a network using a peer-to-peer (P2P) file distribution application. Relevant rank region information can be located on a set of mobile devices and shared as needed.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
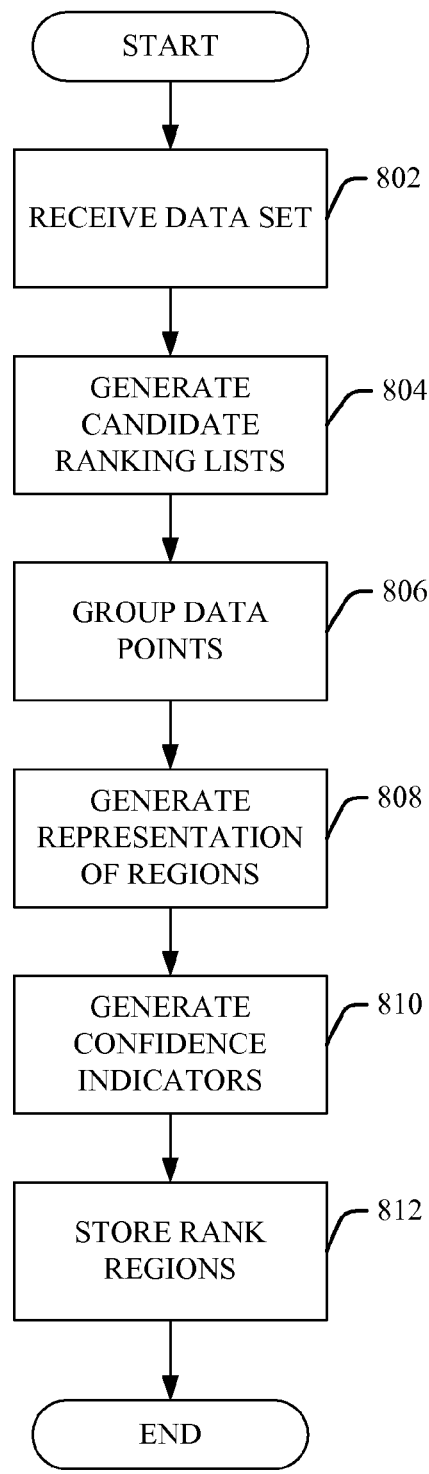
FIG. 8 illustrates a methodology for generating rank regions in accordance with an aspect of the subject matter disclosed herein.
Figure 9:
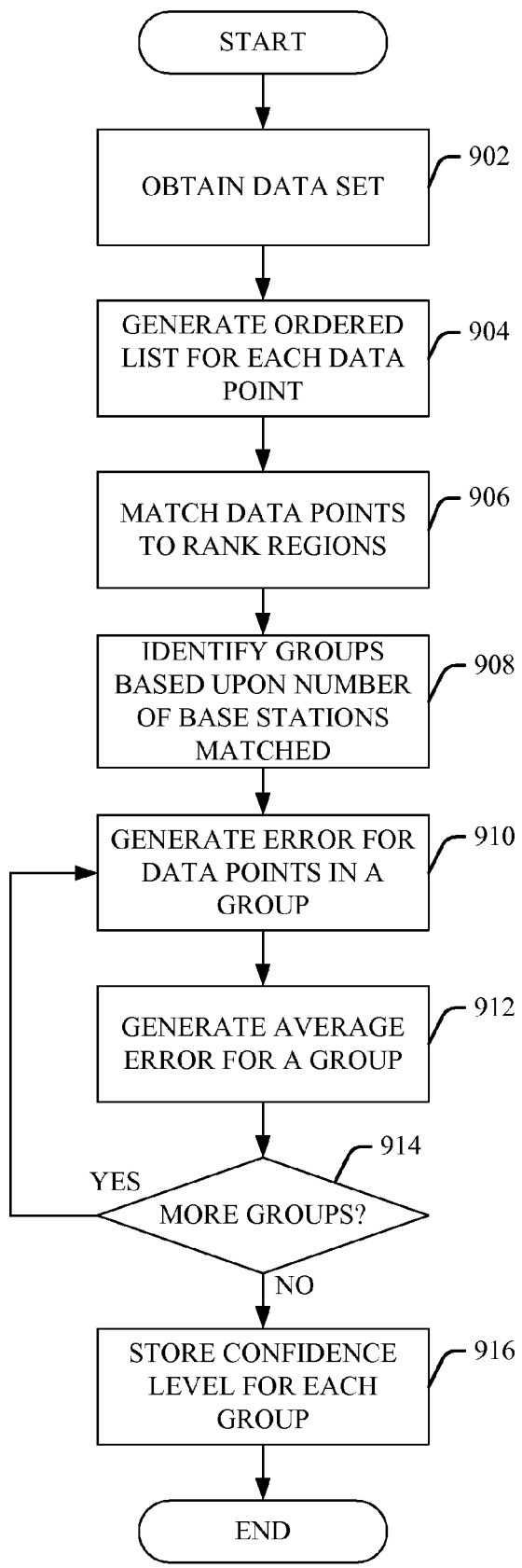
FIG. 9 illustrates a methodology for generating confidence indicators in accordance with an aspect of the subject matter disclosed herein.
Figure 10:
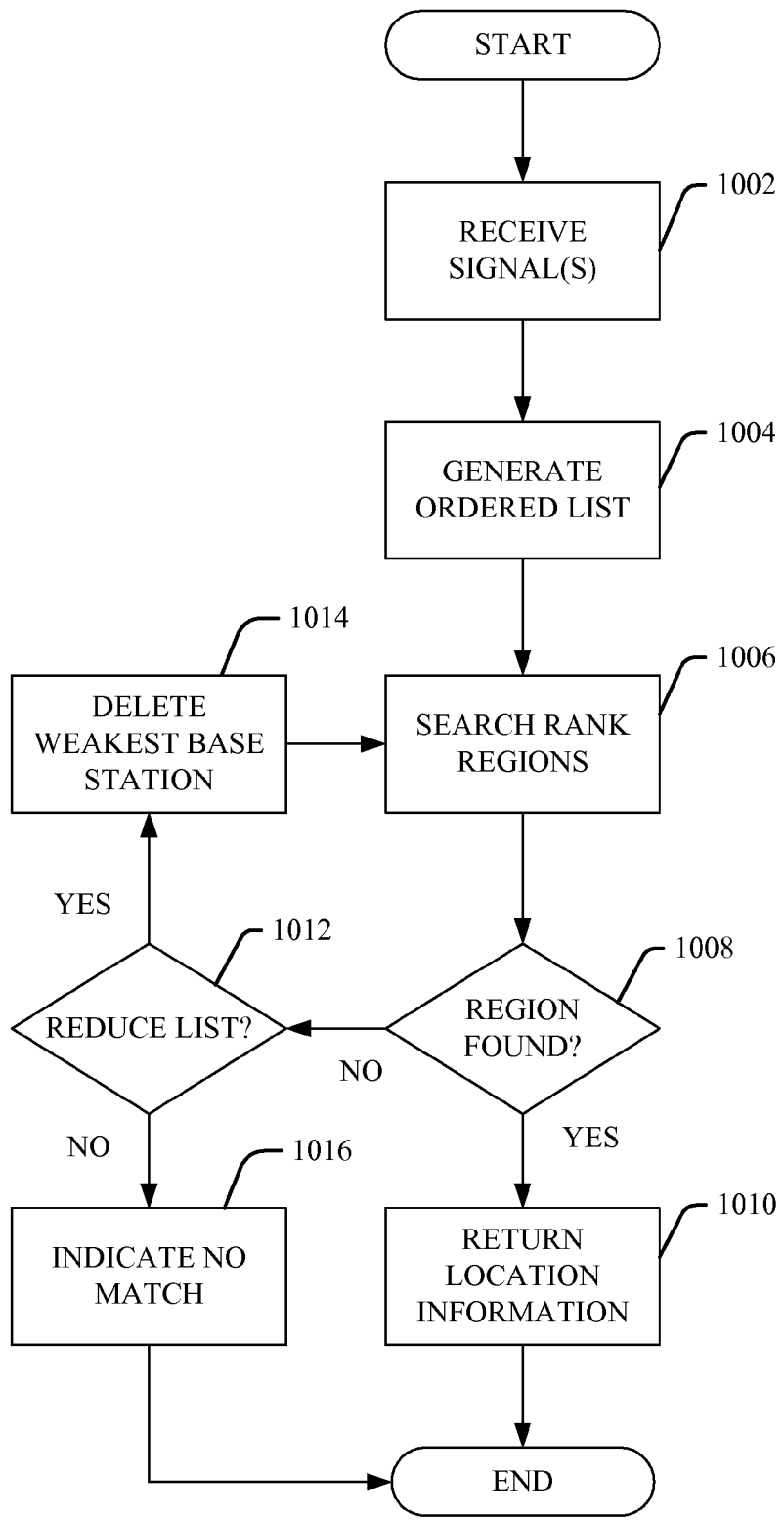
FIG. 10 illustrates a methodology for locating a mobile device in accordance with an aspect of the subject matter disclosed herein.

In view of the exemplary systems described supra, methodologies that may be implemented in accordance with the disclosed subject matter will be better appreciated with reference to the flowcharts of FIGS. 8, 9 and 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Referring now to FIG. 8, a methodology for generating rank region data is illustrated. At reference numeral 802, one or more data sets are received. The data sets can include input data points, including war driving data, such as lists of identifiers of detected base stations, received signal strengths and the locations from which the received signal strengths were measured. A list of possible or candidate base station rankings can be generated at reference numeral 804. The list can include every possible permutation of each combination of base stations. The rankings or ordered lists can be limited to a maximum, fixed length. In this case, the possible rankings of base stations will be limited to lists less than or equal to the predetermined maximum length. This maximum length can be equal to the maximum number of base stations that can be expected to be detected in a single scan. Each ranking can include a subset of the strongest base stations. For example, if four base stations were detected, and their rank order from strongest to weakest was (A, B, C, D), then this ranked list can contribute to four different rank regions: (A, B, C, D), (A, B, C), (A, B) and (A).

In one example, for three detected base stations, A, B and C, there are fifteen candidate or possible ordered lists that can be created using combinations of the three base stations. The first three possible ordered lists include only one of the base stations: (A), (B) and (C). There are three possible ordered lists that include two base stations. Each combination of two base stations includes two permutations. Therefore, for three detected base stations there are a total of six ordered lists that include two base stations: (A, B), (B, A), (B, C), (C, B), (A, C) and (C, A). Finally, there are six permutations that contain all three of the detected base stations: (A, B, C), (B, A, C), (B, C, A), (A, C, B), (C, A, B) and (C, B, A). Consequently, there are three possible or candidate ordered lists with one base station, six candidate ordered lists with two base stations and six candidate ordered lists with all three base stations, for a total of fifteen candidate ordered lists.

Rank regions can be determined by searching the input data for data points that match the candidate ordered lists. In practice, the candidate ordered lists can be limited to actual rankings that occur in the input data set, including subsets of strongest base stations. At reference numeral 806, the input data points can be grouped based upon the ranking of the base stations for the input data points. The grouped data points can be used to generate a summary representation of the region over which the ranking holds true at reference numeral 808. The summary representation can be an average of the associated locations of the input data points, a median of the respective coordinates of the data points, a bounding polygon enclosing the data points or any other representation of the region. The rank region can be represented as a single point to enhance computational efficiency and minimize storage requirements.

At reference numeral 810, one or more confidence indicators can be computed for each rank region. Confidence indicators can be computed in various ways including measuring the spatial spread of the input data points used to construct the rank region. Alternatively, a set of test data separate for the input data points can be used to empirically compute the error associated with each rank region. After the rank regions have been determined, the rank regions can be stored in the rank region data store at reference numeral 812.

Referring now to FIG. 9, a methodology for generating confidence levels is illustrated. At reference numeral 902, a data set is obtained. The data set can include multiple input data points. Each input data point can include a list of identifiers for detected base stations, received signal strengths from the base stations and the location from which the received signal strengths were measured. The locations can be determined using GPS or any other methodology capable of accurately determining location at time the signals were received.

At reference numeral 904, a rank or ordering of detected base stations can be generated for each of the input data points. At reference numeral 906, the ordered list of base stations for each data point can be used to determine the rank region for the input data point. The input data points can be grouped based upon the number of base stations used to match the input data point to a rank region at reference numeral 908. For instance, input data points matched to regions using seven base stations can be grouped together, while input data points matched to regions using six base stations would be in a separate group.

At reference numeral 910, error can be determined for each input data point in a group. Error can be calculated as the distance between the location information of the rank region of the input data point and the known location of the input data point. The errors for all input data points in a group can be averaged to determine the average error based upon the number of base stations matched to determine a rank region at reference numeral 912. At reference numeral 914, a determination is made as to whether there are additional groups to process. If yes, the process returns to reference numeral 910. If no, the process continues to reference numeral 916 where the average error, or confidence level for each group can be stored.

Referring now to FIG. 10, a methodology for locating a mobile device is illustrated. At reference numeral 1002, one or more signals are received from one or more base stations. The signal strength of each of the received signals can be measured and the base stations identified. At reference numeral 1004, a list of base stations can be generated. The list can be sorted by received signal strength (e.g., highest to lowest) to provide an ordered list of base stations. For example, the first base station in the list can provide the strongest signal and the last base station in the list can provide the weakest signal, as measured from the mobile device's current position.

At reference numeral 1006, the ordered list of base stations can be used to search a set of rank regions. For example, the ordered list can be used as a query into a rank region database. A determination is made at reference numeral 1008 as to whether a rank region that matches the ordered list is found. If yes, the location information for the matching rank region is returned at reference numeral 1010. The location information can include latitude and longitude or any other location specifier associated with the selected rank region. Location within the rank region can be further determined based upon a comparison of signal strengths to data points used to generate the selected rank region. In addition, confidence indicators, such as confidence level or confidence radius can be returned. The confidence indicators can assist the mobile device in determining the accuracy of the location information. If no match is found, a determination is made as to whether the ordered list can be reduced for further searching at reference numeral 1012. Reducing the ordered list consists of eliminating the base station or stations with the weakest signal. The ordered list can be reduced until the list includes a single base station. If the ordered list can be reduced, the base station with the weakest signal can be deleted from the ordered list at reference numeral 1014 and the rank regions are searched using the newly shortened ordered list at reference numeral 1006. If no, an indication is returned that no matching rank region was located at 1016 and the process terminates.

Figure 11:
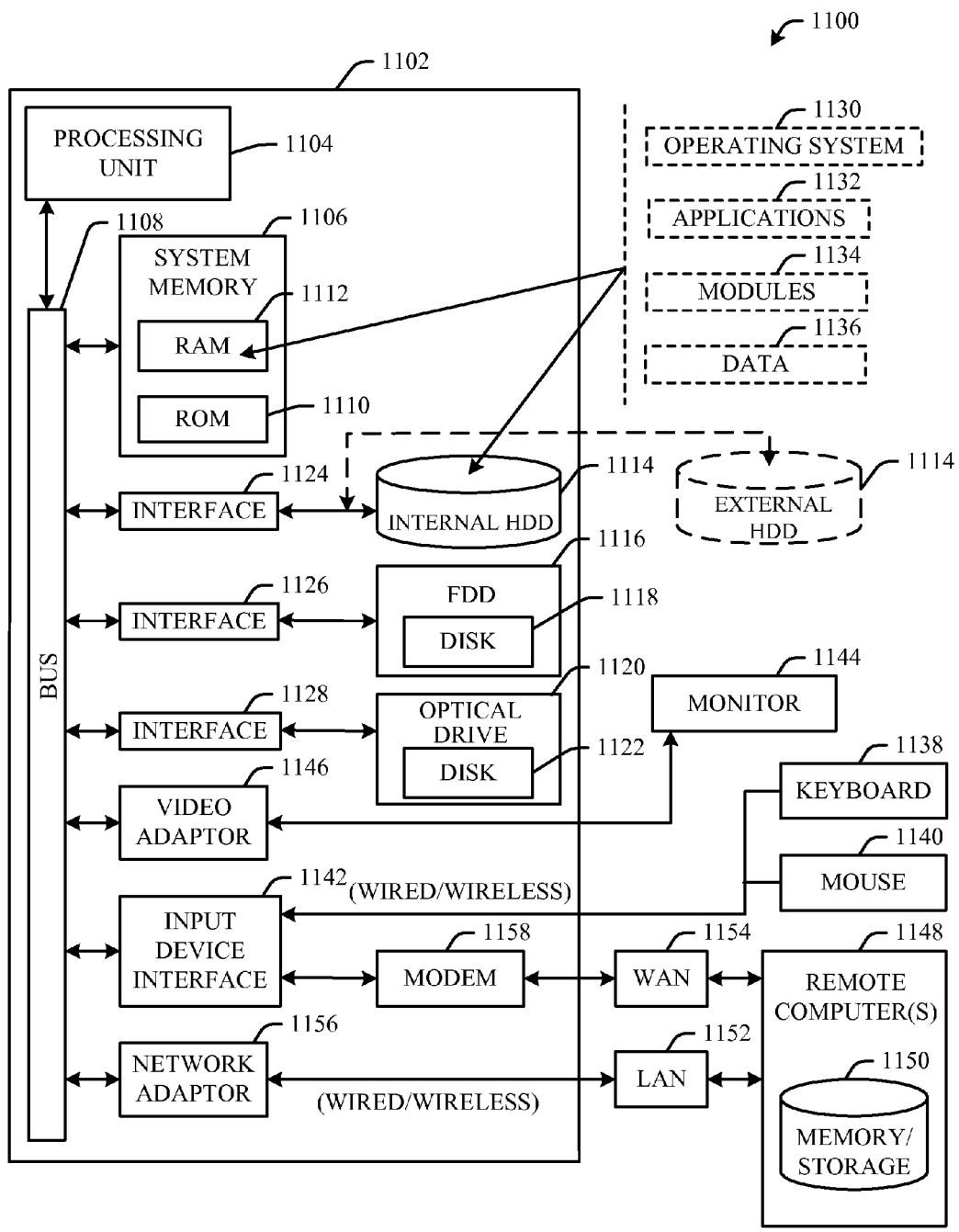
FIG. 11 is a schematic block diagram illustrating a suitable operating environment.
Figure 12:
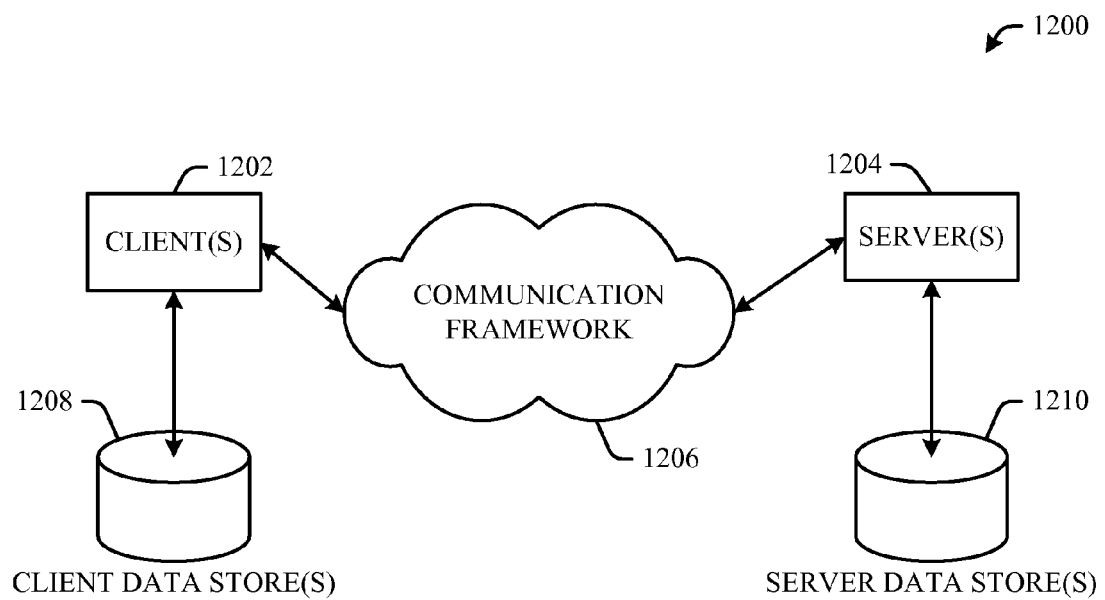
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the system and methods disclosed herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the systems and methods described herein can be practiced on stand-alone computers. In a distributed computing environment, program modules may be located in both local and remote memory storage devices.

With reference again to FIG. 11, the exemplary environment 1100 for implementing various aspects of the embodiments includes a mobile device or computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer or mobile device 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the subject systems and methods.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the systems and methods can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc. A display device 1144 can be used to provide a set of group items to a user. The display devices can be connected to the system bus 1108 via an interface, such as a video adapter 1146.

The mobile device or computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g., a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 12 is a schematic block diagram of a sample-computing environment 1200 with which the systems and methods described herein can interact. The system 1200 includes one or more client(s) 1202. The client(s) 1202 can be hardware and/or software (e.g., threads, processes, computing devices). The system 1200 also includes one or more server(s) 1204. Thus, system 1200 can correspond to a two-tier client server model or a multi-tier model (e.g., client, middle tier server, data server), amongst other models. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system for determining a location of a mobile device, comprising:
    a receiver component for the mobile device that receives signals from a plurality of base stations;
    a ranking component that generates a ranking of base stations based upon signal strengths of signals received at a specific mobile device location;
    a rank region data store that maintains a plurality of rank regions, each of the plurality of rank regions being associated with a physical region and being defined by a base station ranking of signal strengths of a plurality of base stations, the signal strengths measured at one or more particular locations located within the physical region and each of the plurality of rank regions having location information including a location estimate for the rank region, the location estimate being based at least in part on the one or more particular locations; and
    a search component that obtains location information from the rank region data store by matching the generated ranking of base stations to one of the base station rankings defining one of the rank regions and retrieving the location information associated with that rank region.

2. The system of claim 1, wherein the location information includes a confidence indicator that indicates the accuracy of the location information.

3. The system of claim 1, further comprising:
    an output component that returns the obtained location information.

4. The system of claim 3, wherein the location information associated with the rank region is represented as a single geographic point.

5. The system of claim 3, wherein the location information associated with the rank region is based at least in part upon an average of a plurality of data points within the rank region.

6. The system of claim 1, further comprising:
    a confidence component that generates a confidence indicator for the location information.

7. The system of claim 6, wherein the confidence indicator is based at least in part upon the ranking.

8. A method for determining a location of a mobile device, comprising:
    obtaining, by a computing device, signals from a plurality of base stations at a specific mobile device location;
    generating, by the computing device, an ordered list of the base stations based upon signal strengths of the obtained signals;
    matching, by the computing device, the ordered list of base stations to a base station ranking which defines a rank region, the rank region being one of a plurality of rank regions, each of the plurality of rank regions being associated with a physical region and being defined by a base station ranking of signal strengths of a plurality of base stations, the signal strengths measured at one or more particular locations located within the physical region and each of the plurality of rank regions having a location estimate for the rank region, the location estimate being based at least in part on the one or more particular locations; and
    obtaining, by the computing device, the location estimate associated with the rank region defined by the matching base station ranking.

9. The method of claim 8, wherein the location estimate is a single geographic point.

10. The method of claim 8, further comprising:
    generating the plurality of rank regions based at least in part upon a plurality of input data points for a geographic area.

11. The method of claim 10, wherein generating the plurality of rank regions further comprises:
    grouping the plurality of input data points into rank regions based upon received signal strengths for the input data points; and
    generating a summary representation for each rank region in the plurality of rank regions.

12. The method of claim 11, wherein generating the summary representation includes averaging the input data points.

13. The method of claim 8, further comprising generating a confidence level for the location estimate.

14. A system for determining a location of a mobile device, comprising:
    means for receiving signals from a plurality of base stations;
    means for generating an ordered list of the base stations based at least in part upon signal strengths of signals received at a specific mobile device location;
    means for matching the ordered list of base stations to a base station ranking which defines a rank region, the rank region being one of a plurality of rank regions, each of the plurality of rank regions being associated with a physical region and being defined by a base station ranking of signal strengths of a plurality of base stations, the signal strengths measured at one or more particular locations located within the physical region and each of the plurality of rank regions having location information including a location estimate for the rank region, the location estimate being based at least in part on the one or more particular locations; and
    means for obtaining the location information associated with the rank region defined by the matching base station ranking.

15. The system of claim 14, further comprising:
    means for obtaining a confidence indicator associated with the rank region defined by the matching base station ranking.

16. The system of claim 15, wherein the confidence indicator is based at least in part upon number of base stations in the generated, ordered list.

17. The system of claim 14, wherein the location information is obtained based upon a subset of the ordered list.

* * * * *